(12) United States Patent
Frith et al.

(10) Patent No.: US 7,169,427 B2
(45) Date of Patent: Jan. 30, 2007

(54) FIBRE CONTAINING COMPOSITION

(75) Inventors: William James Frith, Bedford (GB); Ian Timothy Norton, Bedford (GB); Bettina Wolf, Bedford (GB)

(73) Assignee: Unilever Bestfoods, North America, division of Conopco, Inc., Englewood Cliffs, NJ (US)

( * ) Notice: Subject to any disclaimer, the term of this patent is extended or adjusted under 35 U.S.C. 154(b) by 320 days.

(21) Appl. No.: 10/213,228

(22) Filed: Aug. 6, 2002

(65) Prior Publication Data

US 2003/0031774 A1 Feb. 13, 2003

(30) Foreign Application Priority Data

Aug. 10, 2001 (EP) .......................................... 01306859

(51) Int. Cl.
*A23L 1/05* (2006.01)

(52) U.S. Cl. .................... 426/573; 426/576; 426/577; 426/578; 426/602; 516/106; 516/107

(58) Field of Classification Search ................ 426/573, 426/576, 577, 578, 602, 506; 516/21, 106, 516/107, 902
See application file for complete search history.

(56) References Cited

U.S. PATENT DOCUMENTS

| | | | | |
|---|---|---|---|---|
| 4,917,915 A | * | 4/1990 | Cain et al. | 426/573 |
| 4,943,445 A | * | 7/1990 | Norton et al. | 426/573 |
| 5,151,290 A | * | 9/1992 | Norton et al. | 426/576 |
| 5,659,000 A | | 8/1997 | Cain et al. | |
| 5,952,007 A | | 9/1999 | Bakker et al. | |
| 6,048,564 A | * | 4/2000 | Young et al. | 426/573 |
| 6,136,363 A | | 10/2000 | Bialek et al. | |
| 6,165,534 A | | 12/2000 | Luzio et al. | |
| 2004/0219278 A1 | * | 11/2004 | Reddy | 426/601 |
| 2004/0247767 A1 | * | 12/2004 | Fischer et al. | 426/601 |
| 2005/0042192 A1 | * | 2/2005 | Evans et al. | 424/70.11 |

FOREIGN PATENT DOCUMENTS

| | | |
|---|---|---|
| EP | 0398411 | * 11/1990 |
| EP | 0398412 | * 11/1990 |
| EP | 574 973 | 12/1993 |
| EP | 832 835 | 3/1994 |
| EP | 841 856 | 1/2000 |
| EP | 1285588 | * 2/2003 |
| WO | 97/04660 | 2/1997 |
| WO | 97/08956 | 3/1997 |
| WO | 99/51716 | 10/1999 |

OTHER PUBLICATIONS

Partial European Search Report and Incomplete Search on Application No. EP 01 30 6859 dated Feb. 13, 2002.
Wolf et al., *Influence of Gelation on Particle Shape in Sheared Biopolymer Blends*, Journal of Rheology, American Institute of Physics, Easton, PA, vol. 45, No. 5, Sep. 2001, pp. 1141–1157.
Wolf et al., *Shear–induced anisotropic microstructure in phase–separated biopolymer mixtures*, Food Hydrocolloids 14, (2000), pp. 217–225.
Wolf et al., *Shear behaviour of biopolymer suspension with spheroidal and cylindrical particles*, Rheologica Acta 40 (2001), pp. 238–247—mentioned on pp. 3 and 11 of the specification.
Co–pending application for: Fischer et al.; Ser. No. 10/486,616; Filed Feb. 10, 2004.

* cited by examiner

Primary Examiner—N. Bhat
(74) Attorney, Agent, or Firm—Gerard J. McGowan, Jr.

(57) ABSTRACT

Compositions of a water in water emulsion having a first phase of gelled particles with specific aspect ratio and width, are suitable for application in products. The compositions impart a creamy impression to the final product.

13 Claims, 1 Drawing Sheet type of flow flow pattern drop shape velocity gradient $G =$ rotation rate simple shear $du_z/dy$ $G/2$

| | |
|---|---|
| type of flow | simple shear |
| flow pattern |  |
| drop shape |  |
| velocity gradient G = | $du_z/dy$ |
| rotation rate | G/2 |

FIBRE CONTAINING COMPOSITION

FIELD OF THE INVENTION

The invention relates to a process for producing a composition comprising two phases and to the product thus obtained, and to food products containing said composition.

BACKGROUND TO THE INVENTION

It is an object of the current invention to provide a product, especially a food product that shows a thick consistency even at relatively high shear rates.

High shear rates are encountered when applying a spread like composition to bread. Examples of such composition are fresh cheese and low fat spreads.

The invention especially relates to food products showing a creamy mouthfeel.

Products giving a creamy mouthfeel are known in the art. Example of such products are dairy creams, spreadable dairy products such as those disclosed in EP-A-841856, full fat fresh cheese type products, creme fraiche and like products.

These products impart a creamy mouthfeel even at the high shear rates of chewing the product. In general such compositions are largely based on fat and/or gelatine or gelatine replacers.

It is known to reduce the fat content of such products by including biopolymers as fat replacers. However the resulting products usually do not impart creamy mouthfeel in the way the original products do.

EP-A-432835 discloses fluid compositions comprising at least one chemically setting gelling agent. The compositions can be obtained by shearing a liquid containing a chemically setting gelling agent, while gelation occurs. The compositions comprise gel particles having a mean diameter of preferably less than 100 micrometer. Such compositions allegedly possess favourable rheological properties. The compositions obtained comprise a suspension of irregularly shaped gel particles that are effective at increasing the viscosity at low shear rates, but less so at high shear rates.

EP-A-574,973 discloses the preparation of a composition comprising at least 2 gelling agents forming at least 2 distinct phases under cooling while applying shear until at least one of the two phases is gelled. The processing of the two phases takes place in conventional A- and C units. These units impart to the composition turbulent flow conditions which lead to products with a dispersed phase which has a variety of shapes which are mainly spherical with a broad average diameter distribution for the dispersed phase particles. These compositions were found not to contribute to a creamy mouthfeel in the final products.

Furthermore Wolf et al disclose in Food hydrocolloids 14 (2000), 217–225 the effect of shear history on microstructure in biopolymer mixtures that form water-in-water emulsions upon de-mixing. It discloses the use of simple shear to manipulate phase morphology of water-in-water emulsions in order to produce regular ellipsoidal or elongated structures. Cooling at the same time as applying shear is used to gel the biopolymers and trap the structures in order to produce anisotropic gel particles.

Furthermore Wolf et al disclose in Rheologica Acta 40 (2001), 238–247 the production of particles with high aspect ratio. This document does not disclose nor suggest which compositions could be applied in food products. Furthermore this document does not disclose a continuous production process for such particles.

It is therefore an object of the current invention to provide a composition which when used in a product imparts a creamy impression upon use.

SUMMARY OF THE INVENTION

It has surprisingly been found that a composition comprising a first aqueous phase of gelled particles and a second aqueous phase, wherein the particles of the first phase are characterized by a specific aspect ratio in combination with a specific average width, imparts to products the desired creamy impression.

Therefore the invention relates to a composition comprising a first aqueous phase of gelled particles and a second aqueous phase wherein the particles of the first phase are characterized in that a minimum of 80 vol % of the particles have an aspect ratio of at least 2, and a maximum width of 100 μm and in that a minimum of 50 vol % of the particles have an aspect ratio of at least 5, and a maximum width of 40 μm and a minimum of 20 vol % of the particles have an aspect ratio of at least 10, and a maximum width of 20 μm.

In a further aspect the invention relates to products comprising this composition and to a process for the preparation of these products.

DETAILED DESCRIPTION OF THE INVENTION

The compositions according to the invention are capable of imparting creaminess to a product at surprisingly low concentrations. Furthermore the compositions and products containing these are freeze thaw stable, and show de/re hydration stability. Advantageously the compositions according to the invention maintain a relatively high viscosity at high shear conditions.

The compositions known from prior art usually do not show this relatively high viscosity at high shear but show a greater degree of so called shear thinning behaviour under shear than the present composition. Without wishing to be bound by any theory it is believed that this behaviour occurs because the gelled particles adopt random orientations and configurations when shear is applied to the composition, that persist at high shear rates. This is not disclosed in any of the aforementioned publications, where the gelled particles are aligned in the flow direction and are different as a result.

In the description and claims where weight % (wt %) is used this is weight % on total product weight unless otherwise indicated.

Aspect ratio is calculated by dividing the length of a fibre by the width.

The accuracy of the data relying on analysis of aspect ratio and width show a deviation of ±10%. The determination of aspect ratio and width is defined in the examples. Both are well known parameters for characterisation of dispersed phase shape and size; see e.g. 'The Image Processing Handbook 2nd edition' by JC Russ, CRC Press London, ISBN 0-8493-2516-1, published in 1994.

The composition according to the invention is a dispersion comprising two aqueous phases. The first phase is a phase of gelled particles. Such particles are present dispersed in the second phase.

The gelled particles of the first phase are characterised by a specific aspect ratio in combination with a specific width. A minimum of 80 vol % of the particles have an aspect ratio of at least 2, and a maximum width of 100 μm and a minimum of 50 vol % of the particles have an aspect ratio of at least 5, and a maximum width of 40 μm and a minimum of 20 vol % of the particles have an aspect ratio of at least 10, and a maximum width of 20 µm. This distribution of particle aspect ratio and width can be considered a broad distribution. Without wishing to be bound by any theory, applicants believe that this broad distribution imparts to the compositions the desired behavior under shear and the limited shear thinning properties of the claimed material.

Preferably at least 5 vol % of the particles are characterised by an aspect ratio of at least 50, and a maximum width of 20 µm. More preferably the particles are characterised by a minimum width of 0.5 µm, more preferred 1 µm.

The particles of the first phase are gelled particles. Gelled particles are defined as particles that may have shapes ranging from spherical to ellipsoidal to highly elongated in one direction, that comprise a gel forming compound solution in water which compound is in the gelled state.

The gelled particles preferably comprise a biopolymer or a combination of biopolymers. Gelling biopolymers are generally known and include for example gellan, κ-carrageenan, sodium alginate, gelatine, agar, agarose, maltodextrin, and heat set proteins.

Gelation can be obtained in any suitable way. The gelation treatment is preferably selected from the group comprising a temperature treatment, chemical gelation or crystallisation. The gelation method that is selected depends on the ingredient composition of the dispersed phase and of the continuous phase.

Gelation by temperature treatment is selected if a gelling agent is used, whose setting is dependent on temperature. Examples of such gelling agents include gelatine, which sets at a temperature of below about 40° C. and agar which sets at a temperature of below about 45° C. and carrageenan or gellan whose gelation temperatures are dependent on salt type and concentration (reference is made to Handbook of hydrocolloids, edited by G. O. Phillips and P. A. Williams, published by CRC Press). Also proteins that gel/form a network by heat treatment are suitable for preparation of the two phase composition.

It will be appreciated that the exact gelling temperature for the biopolymer used is determined, among others, by quality, purity, concentration, solvent properties such as added salt or sugar, and pH.

According to another embodiment, a chemically setting gelling agent is used. By a chemically setting gelling agent is meant a component which, after being dispersed in another phase such as a liquid, will set to a gel when allowed to chemically interact with a supplementary active component, whose active component is usually a cation, or which sets due to the occurrence of a chemical reaction such as oxidation. A gelling agent setting upon a pH change is also encompassed in the term chemically setting gelling agent. Examples of such pH dependent gelling agents are proteins which will generally set or precipitate at a pH below the iso-electric point.

In such cases where a chemically setting gelling agent is applied, chemical gelation is preferably applied. Chemical gelation can be obtained by combining the gelling agent with a salt with an effective cation to form a salt of the gelling agent and the cation. The combination of the gelling agent with the cation may be effected by the addition of the cation as such or alternatively by converting a precursor compound, present in the phase comprising the gelling agent, or the other phase, into the free, effective, cation. The cation is preferably selected from $Ca^{2+}$ and $K^+$, $Na^+$ and mixtures thereof, the most preferred cation is $Ca^{2+}$.

In an even more preferred embodiment, the gelling agent is selected from the group comprising κ-carrageenan, pectin, iota-carrageenan, furcelleran, carboxymethyl cellulose, gellan, gelatine, alginate, agar, guar or a combination thereof; most preferably gellan or κ-carrageenan.

In a preferred embodiment gelation by temperature treatment is used. The most preferable temperature treatment is cooling, hence, a biopolymer gelling upon cooling is most preferably used in the first phase.

The amount of first phase compared to second phase among others depends on the application that is envisaged. In general it is preferred that the phase volume of the first, dispersed, phase in the second, continuous, phase is from 10 to 40 vol %.

As described above, it is required that at least the first phase is gelling.

The second phase is preferably composed such that the interfacial tension between the two phases in their liquid state and on onset of gelation of the first phase is sufficiently low to prevent the particles of the first phase from shape relaxation during or after gelation. By shape relaxation we mean significant if not total loss of anisotropy in particle shape. Preferred interfacial tensions between the two aqueous phases in their liquid state are between $10^{-6}$ N.m$^{-1}$ and $10^{-3}$ N.m$^{-1}$. The phenomenon of interfacial tension in biopolymer liquid mixtures is described in Food Hydrocolloids 14 (2000), 217–225. Interfacial tensions in the aforementioned range can be obtained by a variety of compositions for the second phase. The second phase can be based for example on a non-gelling biopolymer, a surfactant, a water soluble synthetic (i.e. non-biological) polymer such as poly(ethylene oxide), poly(acrylic acid) or poly(acrylamide), or a gelling biopolymer or any combination thereof.

According to a preferred embodiment, the first phase comprises a gelling biopolymer, and the second phase comprises a non-gelling biopolymer.

According to another embodiment, both the first and the second phase comprise a gelling biopolymer.

In a preferred embodiment the biopolymer combination for the first and second phase is selected from the following combinations a) gelatine first phase—guar second phase b) gellan first phase—κ-carrageenan second phase c) gellan first phase—sodium alginate second phase d) κ-carrageenan first phase—carboxymethylcellulose second phase.

Furthermore the compositions can be made heat stable by taking some further straightforward measurements such as increasing the ion content, adding gel stabilisers or using heat set proteins.

The composition can suitably be applied in any type of water continuous product. Examples of products are food products, preferably dairy type spreads, dressings, sauces, or frozen desserts.

The amount of composition that can be applied varies depending on the specific purpose and final product.

In a preferred embodiment, the amount of composition according to the invention contained in a final product is at most 30 wt %. Higher amounts could lead to products which are too thick for application. Preferred products comprise from 3 to 20 wt % of the composition according to the invention.

The composition is especially suitable for inclusion in water continuous food products such as dairy type spreads. In a preferred embodiment the invention relates to a spreadable dairy type product comprising from 5 to 35 wt % fat, 0.2 to 10 wt % protein, and from 3 to 20 wt % of a composition comprising a first aqueous phase of gelled particles and a second aqueous phase, wherein the particles of the first phase are in the form of elongated fibres.

More preferably the invention relates to a spreadable dairy type product comprising from 5 to 35 wt % fat, 0.2 to 10 wt % protein, and from 3 to 20 wt % of a composition comprising a first aqueous phase of gelled particles and a second aqueous phase, wherein the particles of the first phase are characterised in that a minimum of 80 vol % of the particles have an aspect ratio of at least 2, and a maximum width of 100 µm and in that a minimum of 50 vol % of the particles have an aspect ratio of at least 5, and a maximum width of 40 µm and a minimum of 20 vol % of the particles have an aspect ratio of at least 10, and a maximum width of 20 µm.

Preferably the composition included in such dairy type spread comprises a first phase comprising gelled κ-carrageenan and a second phase comprising carboxymethylcellulose.

Optionally such products further include a salt, other biopolymers, preservation agents, flavourings or other food grade ingredients.

Typical compositions suitable for a dairy type spread are e.g. disclosed in WO-A-97/04660 and WO-A-97/08956. These products are generally acidified creams whereby the cream may be based on dairy fat, vegetable fat or a combination of these.

The composition according to the invention may be prepared by any suitable process. However the process below is highly preferred as it enables preparation of the composition in a simple, straight forward and economical efficient process. For example the process introduced in Rheologica Acta 40 (2001), 238–247 discloses a process which is unpreferred for preparation of said composition as this process is unsuitable for application on large, industrial scale.

Therefore in a further embodiment, the invention relates to a process for the preparation of a composition comprising a first aqueous phase of gelled particles and a second aqueous phase, said process comprising the steps of a) mixing two aqueous phases each comprising a polymer, preferably a biopolymer, wherein at least one of the polymers is a gelling biopolymer, b) treating the mixture according to (a) such that one of the phases is present in the form of droplets in the second phase, c) subjecting the mixture to shear flow, d) subjecting the mixture to a gelation treatment during or after step (c);

wherein step (a) and (b) are carried out in a pre-mix tank and step (c/d) are carried out in a cylindrical pipe, or an array of cylindrical pipes.

BRIEF DESCRIPTION OF THE DRAWINGS

In the context of the invention shear flow is defined as planar flow as shown in FIG. 1.

Turbulent flow is unsuitable for the process according to the invention. This type of flow is for example encountered in a scraped surface heat exchanger (A-unit), a pin stirrer (C-unit), a homogeniser and rotor-stator based systems which are well known equipment for preparation of emulsions. Documents wherein these types of apparatus are applied are for example U.S. Pat. No. 5,659,000, EP-A-432, 835, U.S. Pat. No. 6,165.534 and WO-A-99/51716. The turbulent flow in these apparatus' is arbitrary and undefined.

Figure 1:
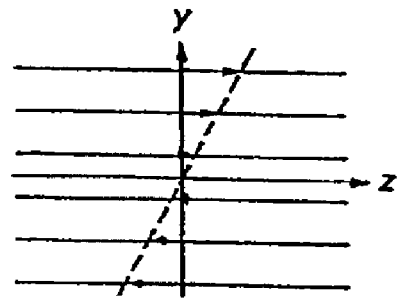
Figure 1:
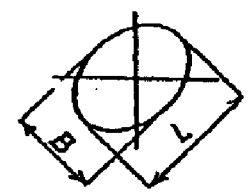

It is preferred that the gelled aqueous phase particles are in the form of elongated fibres, preferably characterised in that a minimum of 80 vol % of the particles have an aspect ratio of at least 2, and a maximum width of 100 µm and in that a minimum of 50 vol % of the particles have an aspect ratio of at least 5, and a maximum width of 40 µm and a minimum of 20 vol % of the particles have an aspect ratio of at least 10, and a maximum width of 20 µm.

In a preferred embodiment, step (a) is simplified by mixing the two biopolymers as dry powders, and adding them in one step to a common aqueous solvent. Depending on the biopolymer combinations used, the mixture of dry powder additionally comprises salt such as sodium chloride or potassium chloride in a preferred concentration. Sugar can also be added to improve solvent conditions.

It will be appreciated that the characteristics of the cylindrical pipe or array of pipes is preferably such that they are sufficiently long and sufficiently small in diameter so that gelation of the first phase occurs within the pipe.

In a preferred embodiment, the flow rate in a single cylindrical pipe is from 0.1 to 25 $ml.min^{-1}$. and the wall shear stress is from 15 to 800 Pa. For the definition of wall shear stress reference is made to textbooks on rheology such as for example: Rheology: Principles, Measurements, and Applications. C. W. Macosko, VCH Publishers, Inc., 1994.

The gelation can be obtained in any of the ways described above.

The final product comprising the composition according to the invention can be prepared in any suitable way. In the following, the composition according to the invention is denoted as fibre composite or fibre composite material.

According to one embodiment a base product is prepared from all ingredients except for the fibre composite material. Ingredients are for example proteins, polysaccharides, fat or oil, salt, sugar, flavours, acids, or other ingredients normally found in such products, and water. Processing can include mixing, homogenisation, emulsification, whipping, heating, and cooling. The fibre composite material is preferably then added to the base product while stirring, sometimes at elevated temperature. Stirring preferably continues till the product appears to be a homogenous mixture of all ingredients, in particular the fibre composite. In some cases the product is then filled directly into product containers, and stored under appropriate conditions. This applies to the preparation of dressings and sauces. For the preparation of dairy type spreads an acidification step preferably follows prior to filling. When a frozen desert product, e.g. ice cream, is prepared, after incorporation of the fibre composite material, the product is whipped, and frozen according to a conventional house hold or factory ice cream process. The final product is stored in a freezer at preferably −18° C.

According to an alternative embodiment the composition according to the invention is submitted to a drying step and in that form added to the final product at any stage of the process. Drying techniques such as freeze drying, or vacuum drying were found to be suitable. Alternatively, the composition according to the invention can be frozen for storage, and added in its frozen state to the product ensuring that the composition thaws completely to impart the desired properties on the product.

According to another alternative embodiment, the composition according to the invention is prepared in situ during the preparation of a final product in which the composition is included.

In a further aspect the invention relates to an apparatus suitable for carrying out the process described above, comprising a pre-mix tank and a cylindrical pipe comprising means for obtaining gelation.

The invention is now illustrated by the following non-limiting examples.

EXAMPLES

General

Oil droplet size is determined by use of well known static laser diffraction.

The procedure of particle shape analysis is described in the following. The fibre composite material was diluted with an aqueous solvent of the same ionic strength as present in the composition. This means the fibre composite was diluted with its own solvent. For dilution a certain amount of the fibre composite was added to a certain amount of the solvent while stirring with a paddle stirrer, or shaking in a flask rotator to prepare a diluted sample for particle shape analysis that contained roughly 1 wt % fibres. In case of a gelled second phase, the type of salt to get the desired ionic strength was carefully chosen in order to melt the gel of the second phase on dilution ensuring the particles of the first phase remained gelled. As a next step, images of the sample were taken using conventional light microscopes under suitable lighting conditions preferably phase contrast, and magnification as low as possible preferably using a 10× phase contrast lens and setting any further means to influence magnification at the lowest setting such as 0.8 on a magnification wheel when fitted to the microscope used. The images taken here pictured a real length of 800 μm along their width. The width of a fibre was measured at least once, most preferably several times along the fibre length at equally spaced locations which were roughly a tenth of the image width apart, hence since the width of the images was 800 μm, the fibre width was measured every ~100 μm along the fibre length. Typically, images showed a number of separate fibres, very small apparently spherical shaped particles, and larger entities that appeared to be associated fibres. Enough images were statistically taken such that 400 fibres were pictured as individual entities meaning they don't overlap with any other fibres. A particle was identified as a fibre when it showed a clear extension in one direction. If a fibre was not pictured with its whole length, the pictured length of this fibre was measured and taken for aspect ratio calculation. The aspect ratio was calculated by dividing the length of a fibre by the width. The width of a fibre was measured at least once, most preferably several times along the fibre length at equally spaced locations which were roughly a tenth of the image width apart, e.g., a magnification of 1:40 corresponds to an image width of 800 μm, hence, the fibre width was measured every ~100 μm along the fibre length. Finally, the average of the measured values was taken as the width of the fibre.

Example 1

A fibre composite was prepared from a mixture of κ-carrageenan and CMC with the following material characteristics.

κ-carrageenan:

A speciality κ-carrageenan (Genuvisco X0909, ex Hercules Limited (UK)) was used, with low residual cations, in particular low Potassium.

The typical composition on powder is:
92.9 wt % κ-carrageenan
5.12 wt % Sodium ions
0.18 wt % Potassium ions
0.01 wt % Calcium ions
0.01 % w/w Magnesium ions The moisture content of the powder is 10 wt %.

The zero shear viscosity of a 1% w/w (on powder) aqueous solution at 20° C. is 0.08 Pa.s ±10%.

carboxymethylcellulose (CMC):

A commercially available CMC (Blanose 7MF, ex CPKelco UK Limited) was used.

The ion content of the batch used is:
7.6 wt % Sodium ions
7 $10^{-3}$ wt % Potassium ions
11.8 $10^{-3}$ wt % Calcium ions
22.6 $10^{-3}$ wt % Choride ions
5 $10^{-3}$ wt % Sulfate ions The moisture content of the powder is 5 wt %.

The zero shear viscosity of a 1 wt % (on powder) aqueous solution at 20° C. is 0.06 Pa.s±10%.

60 g of said κ-carrageenan, 150 g of said CMC, and 15 g Potassium Chloride were mixed dry, and then added to 2775 g deionised water while stirring vigorously with a paddle stirrer. The mixture was then heated up to 95° C. under continued stirring, and kept under these conditions till a liquid mixture of all ingredients had formed. The mixture was transferred into a jacketed, and agitated pre-mix tank which was pre-heated to 95° C. The vessel could take a maximum of 5 l. In the pre-mix tank, the mixture was continued to be stirred, and after 15 min at 95° C. the temperature was lowered to 80° C. Once this temperature was reached, the vessel was set under a hydrostatic pressure of 2.5 bar, and the outlet valve at the bottom of the pre-mix tank was opened to allow for the mixture to flow through a pipe with circular cross section which was jacketed for most of its length. The length and inner diameter of the pipe was 1.2 m and 8 mm respectively. The middle 0.5 m of the pipe were cooled by a water jacket, the temperature of the water incoming at the further end of the jacket was 10° C. The water exited at the end of the jacket which was closer to the pre-mix tank. The product was collected under sterile conditions, and either directly used for preparation of a food product, dried, or stored in a freezer at −18° C. The shape characteristics of the product were not altered by the drying process, or the freezing process, and subsequent re-hydration or thawing respectively.

The hydrostatic pressure of 2.5 bar applied to the pre-mix tank corresponds to a wall shear stress of 417 Pa.

This fibre composite material comprises a non-gelled second aqueous phase dominated by CMC. The particle phase comprises gelled κ-carrageenan fibres. The volume in the mixture occupied by the first, gelled, phase is about 20%.

Example 2

Preparation of a fibre composite from gellan and κ-carrageenan.

gellan:

A commercially available gellan gum (Kelco gel F, ex CPKelco UK Limited) was used.

the ion content is:
3.8 wt % Potassium ions
0.6 wt % Sodium ions
0.3 $10^{-3}$ wt % Calcium ions The moisture content of the powder is 10 wt %.

The zero shear viscosity of a 1 wt % (on powder) aqueous solution at 60° C. (the solution forms a gel at 20° C.) is 7.7 $10^{-3}$ Pa.s±10%.

κ-carrageenan:

The same κ-carrageenan as specified in example 1 was used.

The preparation of the fibre composite material from the two polysaccharides gellan and κ-carrageenan corresponds in its main steps to the previously described example 1. Differences were only in the quantities, the choice of temperatures, and pressure which are quantified below.

Quantities used were 60 g gellan, 60 g κ-carrageenan and 2880 g de-ionised water. The temperature of the water feeding the jacket of the circular pipe was 5° C. The hydrostatic pressure applied to the pre-mix vessel and the wall shear stress were 1.1 bar and 183 Pa respectively.

This fibre composite material comprises a gelled second aqueous phase which is dominated by κ-carrageenan. The first gelled aqueous phase, the fibres, consist of 4.4 wt % gelled gellan. 32 % v/v of the fibre composite are occupied by the gelled gellan particle phase.

Example 3

Preparation of a dairy spread comprising gelled κ-carrageenan fibres.

1000 g dairy spread comprising 250 g fibre composite material prepared from the polysaccharides κ-carrageenan and CMC as described in example 1, 3 g guar, 5 g salt (potassium chloride), 1 g potassium sorbate, 70 g buttermilk powder, 17.5 g whey protein, 220 g fat blend (1:1 fractionated coconut oil:fractionated palm oil), and 433.5 g water was prepared. The fibre composite material was previously frozen, and thawed prior to use. From the dry ingredients and the water a homogeneous mixture was prepared, which was then heated to 85° C. at which temperature the melted fat was added under stirring to from a coarse oil-in-water emulsion. In a next step, for decreasing the average size of the oil droplets to ca. 1 μm, a conventional emulsification step using a high pressure homogeniser followed. The resulting product base was cooled to 40° C. under continued stirring with a paddle stirrer, and the fibre composite material was added in portions of roughly 10 g. After a mixing time of 15 minutes the product was acidified to a pH of 4.7 with 80% lactic acid. This concluded the production of the dairy spread with κ-carrageenan fibres, and the product underwent a sterile filling process into sample containers, and was stored at 6° C.

The resulting composition was found to be creamy upon consumption.

Additionally, the resulting composition was described as having a long texture upon spooning compared to commercial dairy spread products Brunch™ and Creme Bonjour™.

Example 4

Preparation of a fresh cheese comprising gelled gellan fibres 1000 g fresh cheese comprising 156.2 g fibre composite material prepared from the polysaccharides gellan and κ-carrageenan as described in example 2, 3 g guar, 3 g salt (sodium chloride), 1 g potassium sorbate, 70 g buttermilk powder, 17.5 g whey protein, 220 g fat blend (1:1 coconut oil:palm oil), and 529.25 g water was prepared. The preparation of the fresh cheese followed the same route as the preparation of the dairy spread described in example 3. The only difference was a temperature of 60° C. (instead of 40° C.) at which the fibre composite was mixed into the product base.

The resulting composition was found to be creamy upon consumption.

Additionally, the resulting composition was found to be smooth, and mouth coating.

Example 5

Preparation of an ice cream comprising gelled κ-carrageenan fibres

An ice cream comprising 25 wt % fibre composite material prepared from the polysaccharides κ-carrageenan and CMC as described in example 1, 8 wt % butterfat, 10% w/w skim milk powder, 0.3 wt % emulsifier (monoglycerolpalmitate), 13 wt % sucrose, 4 wt % glucose syrup (malto dextran with a DE of 40), 0.012 wt % vanillin, 0.016 wt % carrageenan L100 (which is a blend of 30 wt % sucrose, 34.3 wt % κ-carrageenan, 4.2 wt % ι-carrageenan, 31.5 wt % λ-carrageenan), 0.144 wt % locust bean gum, and 39.528 wt % water was prepared. The dry ingredients were mixed together, and then added to the water which was heated up to 40° C. A homogeneous mixture was prepared by stirring the mixture, then the butterfat was added, and the mixture heated to 82° C. under continued stirring. After a further 5 minutes of stirring at 82° C. the mixture was homogenised using a standard process in ice cream manufacturing process (high pressure homogeniser, fitted with two tapered valves, 140 bar or 2000 psi homogenisation pressure, pre-warmed with hot water). The base product was then cooled to 40° C. where the fibre composite was added under stirring with a paddle stirrer till a homogeneous mixture had formed. For subsequent aeration and freezing, a bench top whisker (hobart ex Hobart UK) and a house hold ice cream maker (model gelato chef 2000 ex magimix UK LTD) respectively were used. The residence time of the product in the whisker was 15 minutes. Overruns of 30% were achieved. In the house hold ice cream maker the product was cooled down to −2° C., the product was then placed for 2 hours in a blast freezer at −37.5° C. For storage the product was kept in a house hold freezer at −18° C.

The product was tasted after it reached a homogeneous temperature of −18° C. It was described as creamy, and rich in taste.

What is claimed is:

1. Composition comprising by phase volume at least 10 vol. % of a first aqueous phase of gelled particles in the form of elongated fibres and a second aqueous phase, wherein the particles of the first phase are characterised in that a minimum of 80 vol % of the particles have an aspect ratio of at least 2, and a maximum width of 100 μm and in that a minimum of 50 vol % of the particles have an aspect ratio of at least 5, and a maximum width of 40 μm and a minimum of 20 vol % of the particles have an aspect ratio of at least 10, and a maximum width of 20 μm.

2. Composition according to claim 1 wherein at least 5 vol % of the particles are characterised by an aspect ratio of at least 50, and a maximum width of 20 μm.

3. Composition according to claim 1 wherein the particles are characterized by a minimum width of 0.5 μm.

4. Composition according to claim 1, wherein the dispersed phase comprises a gelling biopolymer.

5. Composition according to claim 1 wherein the phase volume of the first, dispersed, phase in the second, continuous, phase is from 10 to 40%.

6. Composition according to claim 1 wherein the biopolymer is selected from the group comprising κ-carrageenan, pectin, iota-carrageenan, furcelleran, carboxymethyl cellulose, agar, gellan, gelatine, alginate, guar or a combination thereof.

7. Product comprising the composition according to claim 1 in an amount of at most 30 wt %.

8. Product according to claim 7 comprising from 3 to 20 wt % of the composition according to claim 1.

9. Spreadable dairy type product comprising from 5 to 35 wt % fat, 0.2 to 10 wt % protein, and from 3 to 20 wt % of a composition comprising a first aqueous phase of gelled particles and a second aqueous phase, wherein the particles of the first phase are in the form of elongated fibres.

10. Spreadable dairy type product comprising from 5 to 35 wt % fat, 0.2 to 10 wt % protein, and from 3 to 20 wt % of a composition according to claim 1.

11. Spreadable dairy type product according to claim 9, wherein the composition comprises a first phase comprising gelled κ-carrageenan and a second phase comprising carboxymethylcellulose.

12. Process for the preparation of a composition comprising a first aqueous phase of gelled particles and a second aqueous phase, said process comprising the steps of
  a) mixing two aqueous phases each comprising a polymer, preferably a biopolymer, wherein at least one of the polymers is a gelling polymer,
  b) treating the mixture according to (a) such that one of the phases is present in the form of droplets in the second phase,
  c) subjecting the mixture to shear flow,
  d) subjecting the mixture to a gelation treatment during or after step (c)

and wherein step (a) and (b) are carried out in a pre-mix tank and step (c/d) are carried out in a cylindrical pipe, or an array of parallel cylindrical pipes.

13. Process according to claim 12 wherein the flow rate in a single cylindrical pipe is from 0.1 to 25 ml.min$^{-1}$ and the wall shear stress is from 15 to 800 Pa.

* * * * *